(12) United States Patent
Zhang et al.

(10) Patent No.: US 12,295,091 B2
(45) Date of Patent: May 6, 2025

(54) METHOD FOR OBTAINING STRONG FOCUSING OF ISOCHRONOUS ACCELERATOR BY VARYING MAGNETIC FIELD GRADIENT IN LARGE RADIAL RANGE

(71) Applicant: CHINA INSTITUTE OF ATOMIC ENERGY, Beijing (CN)

(72) Inventors: Tianjue Zhang, Beijing (CN); Wei Fu, Beijing (CN); Chuan Wang, Beijing (CN)

(73) Assignee: CHINA INSTITUTE OF ATOMIC ENERGY, Beijing (CN)

( * ) Notice: Subject to any disclaimer, the term of this patent is extended or adjusted under 35 U.S.C. 154(b) by 209 days.

(21) Appl. No.: 18/214,566

(22) Filed: Jun. 27, 2023

(65) Prior Publication Data

US 2024/0008166 A1   Jan. 4, 2024

Related U.S. Application Data

(63) Continuation of application No. PCT/CN2022/119570, filed on Sep. 19, 2022.

(30) Foreign Application Priority Data

Jun. 29, 2022   (CN) .......................... 202210748317.8

(51) Int. Cl.
   *H05H 13/00*   (2006.01)
(52) U.S. Cl.
   CPC ................................. *H05H 13/005* (2013.01)

(58) Field of Classification Search
   None
   See application file for complete search history.

(56) References Cited

U.S. PATENT DOCUMENTS

| | | | |
|---|---|---|---|
| 8,836,249 B2 * | 9/2014 | Bertozzi | ................. G06F 17/10 |
| | | | 315/504 |
| 9,095,036 B2 * | 7/2015 | Johnstone | ............ H05H 13/085 |
| 11,570,880 B2 * | 1/2023 | Bock | ......................... H05H 7/04 |
| 11,703,552 B2 * | 7/2023 | Godeke | .................... H01F 7/202 |
| | | | 324/244 |

(Continued)

FOREIGN PATENT DOCUMENTS

| | | | | |
|---|---|---|---|---|
| CA | 2840080 A1 | 1/2013 | | |
| CN | 102505981 A * | 6/2012 | ............ | B01D 53/94 |

(Continued)

OTHER PUBLICATIONS

International Search Report of Corresponding Application PCT/CN2022/119570, mailed Dec. 29, 2022, 5 pages.

(Continued)

*Primary Examiner* — Srinivas Sathiraju
(74) *Attorney, Agent, or Firm* — Cooper Legal Group, LLC (57) ABSTRACT

The present application provides a method for obtaining strong focusing of an isochronous accelerator by varying the magnetic field gradient in a large radial range. The method is characterized by the main magnet of the isochronous accelerator providing not only a bending effect but also a focusing effect, equivalent to the effects of quadrupole, sextupole, and octupole magnets used in a synchrotron accelerator.

7 Claims, 2 Drawing Sheets

(56) References Cited

U.S. PATENT DOCUMENTS

| | | | |
|---|---|---|---|
| 2012/0013274 A1* | 1/2012 | Bertozzi | H05H 7/04 315/504 |
| 2013/0009571 A1 | 1/2013 | Antaya | |
| 2014/0055058 A1* | 2/2014 | Johnstone | H05H 7/06 315/503 |
| 2024/0008166 A1* | 1/2024 | Zhang | H05H 13/005 |

FOREIGN PATENT DOCUMENTS

| CN | 102651942 A | 8/2012 | |
|---|---|---|---|
| CN | 103766006 A | 4/2014 | |
| CN | 104813748 A | 7/2015 | |
| CN | 108551717 A | 9/2018 | |
| CN | 109362172 A | 2/2019 | |
| CN | 109561566 A | 4/2019 | |
| CN | 214012657 U | 8/2021 | |
| CN | 114430606 A | 5/2022 | |
| EP | 2730152 A0 | 5/2014 | |
| JP | 2014518443 A | 7/2014 | |
| JP | 2021158210 A | 10/2021 | |
| TW | 201304619 A | 1/2013 | |
| WO | WO-2007077984 A1 * | 7/2007 | B82Y 10/00 |
| WO | 2013006182 A1 | 1/2013 | |

OTHER PUBLICATIONS

First Office Action received in corresponding Chinese patent application No. 202211255595.6, dated Jul. 20, 2023, 11 pages.

Yao, H., et al., "Electric and Magnetic Vertical Focusing Study for 100 MeV High Intensity Proton Cyclotron", Annual Report of China Institute of Atomic Energy, 2008, pp. 31-33.

Notification to Grant the Patent Right received in corresponding Chinese patent application No. 202211255595.6, dated Aug. 4, 2023, 2 pages.

\* cited by examiner

METHOD FOR OBTAINING STRONG FOCUSING OF ISOCHRONOUS ACCELERATOR BY VARYING MAGNETIC FIELD GRADIENT IN LARGE RADIAL RANGE

CROSS-REFERENCE TO RELATED APPLICATION

The present application is a continuation of PCT application No. PCT/CN2022/119570, filed on Sep. 19, 2022, which claims the priority benefit of China application No. 202210748317.8, filed on Jun. 29, 2022. The entireties of PCT application No. PCT/CN2022/119570 and China application No. 202210748317.8 are incorporated herein by reference and made a part of the specification.

BACKGROUND

Technical Field

The present application relates to the technical field of isochronous accelerator, and in particular to method for obtaining strong focusing of an isochronous accelerator by varying a magnetic field gradient in a large radial range.

Description of Related Art

The difference between isochronous accelerator and synchrotron is that isochronous accelerators have a spiral-shaped orbit with a large radial span and many turns of recirculation acceleration. The distribution of large equipment such as magnets and cavities must be arranged not only along the circumference of the accelerator but also along the radius of the accelerator. In contrast, synchrotrons have a closed orbit that is fixed in place. Moreover, synchrotrons have a long orbit length and a dispersed structure, and the distribution of large equipment such as magnets and cavities only need to be arranged along the orbit. Since isochronous accelerators have a spiral-shaped orbit, the path traveled by the beam in the previous and next revolutions is unequal. However, the design requires that the time taken for the beam to travel around the previous and next revolutions is equal to ensure that the beam can receive the peak acceleration voltage of the high-frequency cavity at the next revolution's acceleration gap, just as it did in the previous revolution. This is the reason for the name "isochronous." For synchrotron accelerators, the orbit is closed, and it is the same orbit that is fixed in place. The beam packets on the same orbit are synchronized in time as they are accelerated at each stage along the circumference direction. This is why they are called "synchrotron" accelerators.

Synchrotron accelerators match the relativistic changes in the rotational frequency of the charged particles by quickly synchronously adjusting the radio frequency of the accelerating charged particles on the closed orbit and the magnetic field strength of various magnets over time. Therefore, they can reach higher energy more easily than cyclotrons. Since the orbit of the synchrotron accelerator remains fixed and has a long orbit length and dispersed structure, large equipment such as magnets and cavities can be distributed along the orbit. It is easy to arrange quadrupole, sextupole, and octupole magnets based on the bending magnets to obtain strong focusing and flexibly adjust the working path in the resonance diagram, traverse various resonances, and build high-energy accelerators.

However, it is precisely because of the fundamental principle of synchronously changing the radio frequency and magnetic field strength that determines the accelerated beam of the synchrotron accelerator is pulsed, making it impossible to achieve continuous wave acceleration. In addition, large magnets have long time constants and a low repetition frequency for changing magnetic field strength. Therefore, the average beam intensity of synchrotron accelerators is generally relatively low.

To overcome the shortcomings of the synchrotron accelerator and achieve continuous high-average beam intensity in the isochronous accelerator, it is necessary to obtain stronger axial focusing force based on the transverse alternating magnetic field gradient focusing, in order to achieve continuous beams with higher beam intensity and power.

The prominent technical challenge in obtaining strong radial gradient magnetic field focusing lies in the fact that, compared to synchrotrons, isochronous accelerators lack the ability to incorporate quadrupole (or sextupole) lenses in addition to the dipole bending magnets to achieve strong focusing and chromatic correction, resulting in lower maximum achievable energies.

One of the difficulties in obtaining strong radial field gradient focusing is that, compared to synchronous accelerators, the use of quadrupole (or sextupole) lenses to achieve strong focusing and chromatic correction is limited to cases where the orbit remains fixed or changes very little. This is because each lens is a hole that the orbit must pass through. If the orbit changes, from a single orbit to multiple orbits, such as in the spiral-shaped orbit of a cyclotron, it cannot pass through the hole.

The second difficulty lies in the fact that during the rotation of the spiral trajectory from small to large radius, each passage through the magnetic pole corresponds to many matrices of different order gradients. Each orbit or equilibrium orbit, equivalent to a series of matrix multiplication, corresponds to a point in the resonance diagram. With n rounds or n equilibrium orbits, there are n points, and the line connecting them forms the resonance path. Once this path is determined, the matrices for n rounds are also determined. However, it is currently impossible to define theoretically what kind of beam dynamics requirements these matrices must meet in order to achieve magnetic field first-order gradient, second-order gradient, and third-order gradient. The traditional method is to use a large number of numerical simulations to find a structure that meets the beam dynamics requirements. A large amount of numerical simulation means that many detours or long journeys must be taken to reach the destination. A typical method, such as the method of magnet shimming bar, is to install rough and uneven magnet pole pad corrections on both sides of each magnet pole. By irregularly shimming the iron bar, the local magnetic field is adjusted. The adjustment of the local magnetic field must achieve both the bending and focusing effects, as well as compensating for chromaticity and adjusting high-order aberrations. Obviously, for such high-precision adjustment goals, using a trial-and-error method like magnet shimming without a clear theoretical goal as a guide would be counterproductive.

SUMMARY

The present application provides a method for varying the magnetic field gradient within a large radial range in an isochronous accelerator in order to solve the problems in the prior art. The first objective is to solve the problem of the spiral orbit of the isochronous accelerator, which is not suitable for arranging quadrupole, sextupole, and octupole magnets to obtain strong focusing. The second objective is to solve the problem that the current technology cannot guide the actual accelerator design based on the given theoretical equilibrium orbit matrix of n turns or n matrices that satisfy the beam dynamics, but instead adopts a time-consuming and laborious method of exploratory large-scale numerical calculation.

The present application provides the following technical solution to solve the existing problems in the prior art.

The present application provides a method for obtaining strong focusing of the isochronous accelerator by varying the magnetic field gradient in a large radial range. The method is characterized by a main magnet of the isochronous accelerator provides not only a bending effect but also a focusing effect, which is equivalent to effects of using of quadrupole, sextupole, and octupole magnets in a synchrotron accelerator; the method comprises: introducing a first-order, a second-order, and a third-order magnetic field gradients in the large radial range of the main magnet of the isochronous accelerator to achieve an enhanced focusing, compensation of chromaticity, handling of resonances similar to that provided by a quadrupole, a sextupole, and octupole lenses, and obtain a transverse focusing force required for an isochronous continuous wave acceleration from 1 GeV to 2 GeV.

Providing, by the main magnet of isochronous accelerators, not only a bending effect but also a focusing effect comprises:

1) using a magnetic field with an angularly varying gradient as a main source of an axial focusing force, wherein, a magnetic field distribution is given by a formula of:

$$B(r,\theta)=B_0\gamma(r)[1+f\cos N\theta], N\geq 3 \quad (1)$$

wherein $B_0$ is a central magnetic field, $\gamma$ is a relativistic factor, N is the number of sectors, f is a flutter of a magnetic field and $\theta$ is an angular position;

2) varying the magnetic field gradient radially to simultaneously vary a peak region magnetic field B(r) in a radial direction to satisfy a polynomial form:

$$B(r) = \sum_{i=0}^{n} a_i r^i \quad (2)$$

wherein $\alpha_i$ is a magnetic field gradient adjustment coefficient, r is a closed orbit radius, i is an order of the magnetic field gradient ranging from 0 to n, wherein, the focusing effect refers to a change in an orbit radius of a particle when the particle passing through a magnetic peak region during a cyclotron motion, in addition to a deflection effect caused by the varying magnetic field gradient in different regions.

introducing a first-order magnetic field gradient in the large radial range of the main magnet of the isochronous accelerator to achieve an enhanced focusing similar to that provided by a quadrupole lens comprises:

(1) solving for a radial oscillation frequency $v_x$ and an axial oscillation frequency $v_z$ of the first-order magnetic field gradient; and (2) solving for a magnetic field adjustment coefficients $a_i$ in the equation (2) by solving a system of equations, where i ranges from 0 to 1.

the solving for a radial oscillation frequency $v_x$ and an axial oscillation frequency $v_z$ of the first-order magnetic field gradient in the process (1) comprises:

① solving for a motion equation of a particle:

$$u''+K(s)u=0 \quad (3)$$

wherein u is a lateral displacement in a x or y direction; u" is a second derivative of a lateral displacement, x is a radial direction, and y is an axial direction;

② obtaining a periodic function $K_x(s)$ of a focusing force:

$$K_x(s) = \frac{1}{B\rho}\frac{\partial B_y}{\partial x} + \frac{1}{\rho^2}, \quad K_y(s) = -\frac{1}{B\rho}\frac{\partial B_y}{\partial x} \quad (4)$$

wherein K(s) is a periodic function of the focusing force, $K_x(s)$ is a periodic function of the radial focusing force, and $K_y(s)$ is a periodic function of the axial focusing force that depends on a magnetic field generated by magnet elements arranged around circumference of the isochronous accelerator; $\rho$ is a particle deflection radius, B is a magnetic induction intensity, and $B_y$ is an axial component of a magnetic induction intensity, and the equation (3) is a Hill equation;

③ solving for a transfer matrix within one magnetic field period; wherein one magnetic field period refers to a magnetic focusing unit and a drift space corresponding to the magnetic focusing unit that is repeated periodically around the circumference; an energy corresponding to any loop is selected as a starting point for calculation, a closed orbit is obtained using the radial distribution of the magnetic field, and the transfer matrix M for a beam to propagate one magnetic field period along the equilibrium orbit is obtained;

④ based on the Hill equation, obtaining a relationship equation between the transfer matrix M and beam optical parameters $\alpha$, $\beta$, and $\gamma$ to solve for the $\alpha$, $\beta$, and $\gamma$;

⑤ based on $\alpha$, $\beta$, and $\gamma$, solving for the radial oscillation frequency $v_x$ and the axial oscillation frequency $v_z$.

the solving for a transfer matrix within one magnetic field period comprises:

1) varying a particle phase space motion state in a FDF (Focusing-Defocusing-Focusing) isochronous FFAG accelerator as:

$$\begin{bmatrix} x \\ x' \end{bmatrix} = M_0 M_F M_0 M_D M_0 M_F \begin{bmatrix} x \\ x' \end{bmatrix} \quad (5)$$

wherein x represents a transverse displacement, x' represents a particle scattering angle, $M_0$ is a transfer matrix in a free space, $M_F$ and $M_D$ represent transfer matrices for focusing field and defocusing field, respectively as:

$$M_0 = \begin{bmatrix} 1 & s \\ 0 & 1 \end{bmatrix} \quad (6.1)$$

$$M_{F_x,D_x} = \begin{bmatrix} \cos\frac{\sqrt{1-n}}{\rho}s & \frac{\rho}{\sqrt{1-n}}\sin\frac{\sqrt{1-n}}{\rho}s \\ -\frac{\sqrt{1-n}}{\rho}\sin\frac{\sqrt{1-n}}{\rho}s & \cos\frac{\sqrt{1-n}}{\rho}s \end{bmatrix} \quad (6.2)$$

-continued $$M_{F_z,D_z} = \begin{bmatrix} \cos\frac{\sqrt{n}}{\rho}s & \frac{\rho}{\sqrt{n}}\sin\frac{\sqrt{n}}{\rho}s \\ -\frac{\sqrt{n}}{\rho}\sin\frac{\sqrt{n}}{\rho}s & \cos\frac{\sqrt{n}}{\rho}s \end{bmatrix} \quad (6.3)$$

a transfer matrix $M_{F_x,D_x}$ in equation (6.2) represents a radial focusing and defocusing fields, the transfer matrices for the focusing field $M_{F_x}$ and the defocusing field $M_{D_x}$ are expressed in a same way; the transfer matrix $M_{F_z,D_z}$ in equation (6.3) represents an axial focusing and defocusing fields, the transfer matrices for the focusing field $M_{F_z}$ and the defocusing field $M_{D_z}$ are expressed in a same way;

$\rho$ is a bending radius, n is a magnetic field index, and s is a distance traveled by the particle; n is given by $n=-(r/B)\cdot(\partial B/\partial r)$, wherein r is a motion radius of the particle, B is a magnetic induction, and n is expressed by using coefficients in equation (2); $(\partial B/\partial r)$ is a magnetic field gradient adjustment coefficient at in the equation (2), r is a radius of the closed orbit in the equation (2), and B is an average magnetic field in the equation (2); $M_{11}$ represents a magnification factor and $M_{21}$ represents a focusing-defocusing factor;

2) obtaining a relationship between the transfer matrix in one magnetic field period and the magnetic field configuration $M_0$, $M_F$, $M_D$ by:

$$M = M_0 M_F M_0 M_D M_0 M_F \quad (7)$$

$M_F$ represents a transfer matrix in two directions of the focusing field $M_{F_x}$ and $M_{F_z}$, $M_D$ represents the transfer matrix in two directions of the defocusing field, $M_{D_x}$ and $M_{D_z}$;

3) writing the matrix element $m_{ij}$ of formulas (6.2) and (6.3) for an i-th row and a j-th column as $m_{ij}=f(a_0, a_1, s)$, wherein $a_0$ and $a_1$ correspond to the magnetic field adjustment coefficients $a_i$ in formula (2) when i is 0 or 1, and s is the distance traveled by the particle on the motion trajectory.

obtaining, based on the Hill equation, a relationship equation between the transfer matrix M and beam optical parameters $\alpha$, $\beta$, and $\gamma$ to solve for the $\alpha$, $\beta$, and $\gamma$ comprises:

a. according to the Hill equation, obtaining a solution of the Hill equation by using a transfer matrix M as:

$$M = I\cos\mu + J\sin\mu, J = \begin{bmatrix} \alpha & \beta \\ -\gamma & -\alpha \end{bmatrix} \quad (8)$$

In formula (8), I is a unit matrix, $\alpha$, $\beta$, $\gamma$ are Twiss parameters, and $\mu$ is a horizontal oscillation phase shift;

b. based on formulas (6.1), (6.2), (7), and (8), obtaining a relationship between $\cos\mu$, $\beta$, $\alpha$, $\gamma$, and matrix elements to solve for $\alpha$, $\beta$, and $\gamma$:

$$\cos\mu = \frac{M_{11}+M_{22}}{2} \quad (9.1)$$

$$\beta = \frac{M_{12}}{\sin\mu} \quad (9.2)$$

$$\alpha = \frac{M_{11}-\cos\mu}{\sin\mu} \quad (9.3)$$

-continued $$\gamma = \frac{M_{21}}{\sin\mu} \quad (9.4)$$

solving, based on $\alpha$, $\beta$, and $\gamma$, for the radial oscillation frequency $v_x$ and the axial oscillation frequency $v_z$ comprises:

i. establishing an integral equation for calculating the radial oscillation frequency:

$$v_x = \frac{N}{2\pi}\int_{s_0}^{s_0+L}\frac{1}{\beta(s)}ds \quad (10.1)$$

ii. substituting formula (9.2) into formula (10.1), and solving for a radial oscillation frequency $v_x$ by using a function $\beta(s)$; N is number of magnetic field periods in 360° in an azimuthal direction, and $s_0$ and $s_{0+L}$ are a starting point and an ending point of the magnetic field period, respectively.

solving for a magnetic field adjustment coefficients $a_i$ in the equation (2) by solving a system of equations, where i ranges from 0 to 1, comprises:

I. substituting an expression for $$\beta = \frac{M_{12}}{\sin\mu}$$

from equation (9.2) into equation (10.1);

II. obtaining the integral equation (10.2) containing unknowns of $a_0$ and $a_1$:

$$\frac{N}{2\pi}\int_{s_0}^{s_0+L}\frac{\sin\mu}{M_{12}(a_0,a_1,s)}ds \quad (10.2)$$

wherein $M_{12}(a_0, a_1, s)$ is expressed in terms of matrix elements, with i=1 and j=2, and N is number of magnetic periods in 360° around the circumference, so is a starting point of a magnetic period and $s_{0+L}$ is an ending point;

III. recalculating equations (9.1), (9.2), (9.3), and (9.4) by using equations (6.1), (6.3), (7), and (8), and substituting equation (9.2) into equation (10.1) to obtain the axial oscillation frequency $v_x$ by using the function $\beta(s)$; and IV. using the solved values of $v_x$ and $v_z$ to solve for $a_0$ and $a_1$ in equation (10.2).

The introducing a first-order magnetic field gradient in the large radial range of the main magnet of the isochronous accelerator to achieve a handling of resonances similar to that provided by a quadrupole lens comprises:

1) setting $v_x$ and $v_z$ as a radial and axial oscillation frequencies at an energy point before dangerous resonance occurs;

2) substituting $v_x$ and $v_z$ into equation (10.2) to obtain $a_0$ and $a_1$ in equation (2); wherein $a_0$ is used to adjust a deflection effect of the magnetic field, and $a_1$ is used to adjust the focusing effect of the magnetic field;

3) adjusting the coefficients $a_0$ and $a_1$ to make values of $v_x$ and $v_z$ near a resonance region reach preset values, for achieving a local oscillation frequency adjustment.

Beneficial Effects

1. By adjusting the magnetic field gradient over a large radial range, additional focusing force and matching chromaticity effects are provided, which breaks through the energy limit of the isochronous accelerator.

2. The concept of high-order magnetic field gradient equivalence is proposed to realize the functions of multipole magnets, such as quadrupole, sextupole, and octupole lenses, enhancing focusing, compensating for chromaticity, and dealing with resonances, meeting the beam dynamics requirements of isochronous acceleration.

DESCRIPTION OF THE EMBODIMENTS

1) Radial variation of magnetic field gradient for strong focusing principle: Compared with synchrotron accelerators, synchrotron accelerators use quadrupole (iron) lenses, sextupole (iron) lenses, and octupole (iron) lenses, in addition to using dipole magnets for orbit bending, to achieve strong focusing and chromaticity matching, thereby obtaining high energy. The reason why isochronous (cyclotron) accelerators cannot achieve high energy is that they only have dipole magnets for orbit bending and do not have quadrupole (iron) lenses, sextupole (iron) lenses, etc., making it difficult to achieve strong focusing and chromaticity matching.

2) Compared with synchrotrons, quadrupole (magnetic) lenses, sextupole (magnetic) lenses, etc., can only be used for the same orbit or for orbits with very small changes, because each lens is a hole that the orbit must pass through. If the orbit changes, such as in the spiral orbit of a cyclotron, it cannot pass through this hole.

3) Synchrotrons rely on the basic principle of synchronously variable RF frequency and magnet field strength, which determines that the accelerated beam is pulsed and cannot achieve continuous wave acceleration. Additionally, large magnets have a long time constant and a low repetition frequency for adjusting the magnetic field strength. Therefore, the average beam intensity of synchrotrons is generally lower.

4) In order to overcome the shortcomings of synchrotrons' inability to achieve continuous wave acceleration and to equivalently achieve the strong focusing and chromaticity matching functions of quadrupole (magnetic) lenses, sextupole (magnetic) lenses, and octupole (magnetic) lenses in synchrotrons, on the basis of radial alternating magnetic field gradient focusing, stronger axial focusing force can be obtained, as well as some transverse adjustment effects. This is achieved by innovatively proposing a method of varying the gradient of the magnetic field in the magnet pole peak region of the cyclotron in a large radial range, thereby generating local harmonic fields at specific radial positions on the magnet pole, and obtaining similar effects to multipole magnets such as quadrupole, sextupole, and octupole lenses, for enhancing focusing, compensating for chromaticity, and dealing with resonance, meeting the beam dynamics requirements for isochronous acceleration. Obtaining strong focusing through large-scale radial variation of the magnetic field gradient is a key technical measure for the isochronous accelerator to achieve higher energy and beam intensity.

2. The key technical challenge in implementing radial variation of magnetic field gradient for strong focusing in isochronous accelerators is that the radial span of the accelerator orbit is large, and the number of turns in the synchrotron is high, sometimes with multiple turns overlapping. Each multipole harmonic field that the orbit passes over at each local radius must meet the matching requirements for focusing and chromaticity at the corresponding energy as the spiral orbit rotates from small to large radii. As the orbit traverses each magnet, including different orders of gradients, a large number of matrices are involved. Each turn or equilibrium orbit is equivalent to a series of matrix multiplications, and each matrix corresponds to a point in the resonance diagram. With n turns or n equilibrium orbits, there are n points that are connected to form the resonance path, which then determines the n matrices. However, it is currently unknown what beam dynamics requirements these matrices must satisfy in order to realize the first, second, and third-order gradients of the magnetic field. No one has yet been able to theoretically define these matrices.

3. The processing flow of the present application to overcome the technical difficulties is as follows: firstly, the closed orbit radius r corresponding to the first-order magnetic field gradient is determined, which means that the energy corresponding to the first-order magnetic field gradient is calculated. In an isochronous accelerator, different energies correspond to different orbits. Secondly, after the energy is determined, i.e., the closed orbit radius is determined, the magnetic field gradient adjustment coefficient ai on this radius r is obtained to satisfy the polynomial formula (2). Thirdly, taking the introduction of the first-order magnetic field gradient as an example, the radial oscillation frequency $v_x$ and the axial oscillation frequency $v_z$ are solved. By solving the obtained $v_x$ and $v_y$, the two magnetic field adjustment coefficients $a_0$ and $a_1$ of formula (2) are solved, where i in formula (2) corresponds to 0 and 1 for $a_0$ and $a_1$, respectively. $a_0$ is the adjustment coefficient of the deflection magnetic field for 0-order magnetic field gradient, and $a_1$ is the magnetic field gradient adjustment coefficient for the first-order magnetic field gradient.

4. The bottleneck problem and solution of the present application in overcoming the technical difficulties are as follows: Firstly, the bottleneck problem is how to calculate the radial oscillation frequency $v_x$, axial oscillation frequency $v_z$, and the Twiss parameters $\alpha$, $\beta$, and $\gamma$ based on the "set magnetic field gradient" (taking the first-order magnetic field gradient as an example). The parameters $\alpha$, $\beta$, and $\gamma$ are related to $v_x$ and $v_y$, which are ultimately solved by an integral equation containing the parameter 3. Secondly, the present application uses two forms of transfer matrices M and sets the right sides of the two transfer matrices equal to each other, thus establishing a relationship between the matrix element $m_{ij}=f(a_0, a_1, s)$ and the $\cos \mu$, $\alpha$, $\beta$, and $\gamma$. The parameters $\alpha$, $\beta$, and $\gamma$ are then solved by the relationship between the matrix element m_{ij} and $\alpha$, $\beta$, and $\gamma$. Thirdly, the first form of the transfer matrix M is the transfer matrix of a particle through one magnetic field period, as shown in formula (7), where $M_0$ is the matrix of the non-magnetic zone when a particle rotates through one magnetic field period, $M_F$ is the matrix of the forward magnetic pole when a particle rotates through one magnetic field period, and $M_D$ is the matrix of the reverse magnetic pole when a particle rotates through one magnetic field period. One magnetic field period is a circumferentially periodic magnetic focusing unit that includes a forward magnetic pole, a reverse magnetic pole, and their respective drift spaces. Moreover, the $M_F$ and $M_D$ matrix elements also include the relationship between the element and the magnetic field gradient adjustment coefficient $a_1$ and the magnetic field deflection adjustment coefficient $a_0$. Fourth, the transmission matrix M in the second form utilizes the matrix solution of the Hill equation, as shown in Equation (8), which includes the Twiss parameters alpha, beta, and gamma. Fifth, equating the right-hand side of the two forms of the transmission matrix M establishes the relationship between the matrices $M_F$, $M_D$, $M_0$, and the parameters $\alpha$, $\beta$, $\gamma$. As the matrices $M_F$, $M_D$, $M_0$ are composed of 2×2 matrix elements, this also establishes the relationship between the matrix elements $M_{11}$, $M_{12}$, $M_{21}$, $M_{22}$, and the parameters $\alpha$, $\beta$, $\gamma$. The parameters $\alpha$, $\beta$, $\gamma$ are then obtained by solving Equations (9.1), 9.2, 9.3, and (9.4). Sixth, the two magnetic field adjustment coefficients $a_0$ and $a_1$ in Equation (2) are solved. Since the matrix element $m_{ij}$ contains the relationship between that element and $a_0$ and $a_1$, this relationship is substituted into the integral equations for $v_x$ and $v_z$, and the equations are then solved simultaneously to obtain the deflection magnetic field adjustment coefficient $a_0$ and the magnetic field gradient adjustment coefficient $a_1$ in Equation (2).

Based on the above principles, a method for obtaining strong focusing of an isochronous accelerator by adjusting the magnetic field gradient over a large radial range in the isochronous accelerator is provided.

Figure 1:
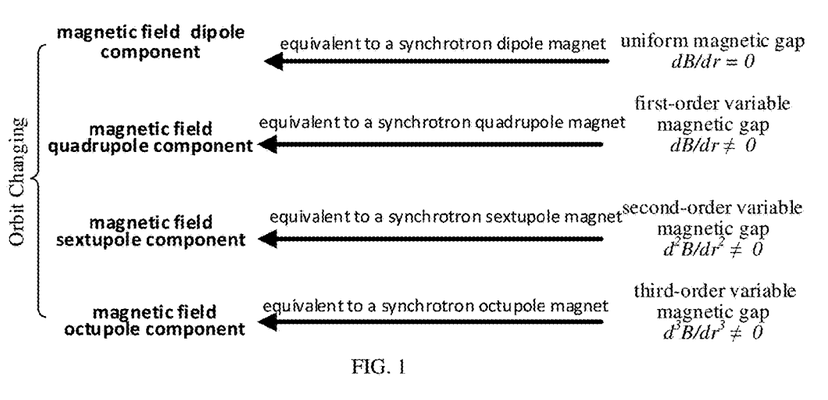
FIG. 1 shows a correspondence between the magnetic field gradient and the magnetic field components according to the present application.
Figure 2:
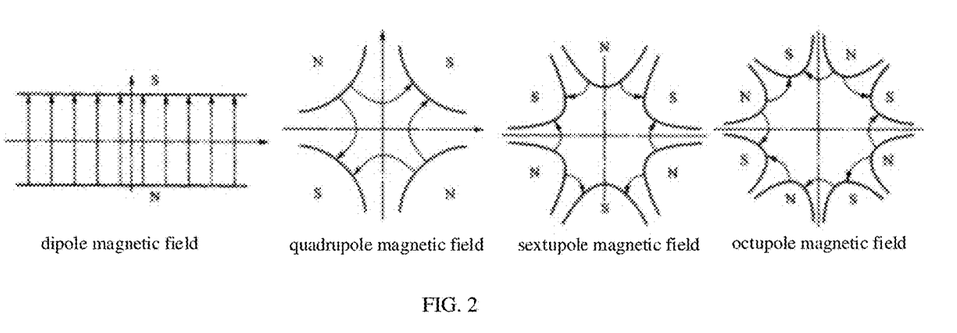
FIG. 2 is a schematic diagram of multi-level magnetic field components according to the present application.

The present application provides a method for obtaining strong focusing of an isochronous accelerator by adjusting the magnetic field gradient in a large radial range, as shown in FIGS. 1 and 2. The main magnet of the isochronous accelerator provides not only the deflection effect but also the focusing effect, which is equivalent to the functions of quadrupole, sextupole, and octupole magnets used in a synchrotron accelerator. By introducing a first, second, and third-order magnetic field gradients in the large radial range of the main magnet of the isochronous accelerator, which is similar to the effects of multipole magnets including quadrupole, sextupole, and octupole lenses, the strong focusing, chromaticity compensation, and resonance treatment can be enhanced, and the transverse focusing force required for isochronous continuous wave acceleration from 1 GeV to 2 GeV can be obtained.

Supplementary Note 1:

The uniform magnetic gap, first-order variable magnetic gap, second-order variable magnetic gap, and third-order variable magnetic gap in FIG. 1 correspond to the magnetic field zero-order gradient, magnetic field first-order gradient, magnetic field second-order gradient, and magnetic field third-order gradient of the present application. The magnetic dipole component, magnetic quadrupole component, magnetic sextupole component, and magnetic octupole component in FIG. 1 correspond to the dipole magnetic field, quadrupole magnetic field, sextupole magnetic field, and octupole magnetic field of the quadrupole magnet in FIG. 2.

Furthermore, the main magnet of the isochronous accelerator not only provides deflection but also has a focusing effect. Specifically:

1) The magnetic field with angularly varying gradients is used as the main source of axial focusing force. The magnetic field distribution is given by the following equation:

$$B(r,\theta) = B_0 \gamma(r)[1 + f \cos N\theta], N \geq 3 \quad (1)$$

Where $B_0$ is the central magnetic field, $\gamma(r)$ is the relativistic factor, N is the number of magnetic pole sectors, f is the magnetic field modulation degree, and $\theta$ is the angular position.

Supplementary Note 2:

The first term on the right side of equation (1) is the central plane magnetic field of the accelerator, and the second term is the magnetic field gradient. The magnetic field gradient is affected by the distance between the magnets, with larger distances resulting in larger magnetic field gradients and vice versa.

2) By using the method of radial variation of magnetic field gradient, the peak magnetic field B(r) is simultaneously varied radially to satisfy a polynomial form:

$$B(r) = \sum_{i=0}^{n} a_i r^i \quad (2)$$

where $a_i$ is the magnetic field gradient adjustment coefficient, r is the closed orbit radius, and i is the order of the magnetic field gradient, ranging from 0 to n. The focusing effect mentioned here refers to the change of the particle's orbit radius as it passes through the magnetic field peak region during the cyclotron motion, and the focusing effect other than the deflection caused by passing through different magnetic field gradient adjustment regions.

Figure 4:
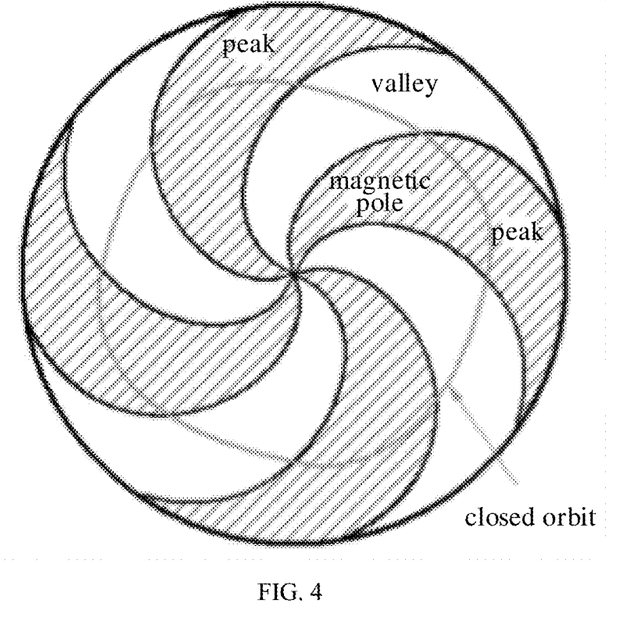
FIG. 4 is a schematic diagram of the closed orbit in the present application according to the present application.

Supplementary Note 3:

1. In formula (2), $r^i$ and i are known parameters, while $a_i$ is an unknown parameter. $r^i$ is the radius of the closed orbit calculated when the closed orbit is solved. The closed orbit is shown in FIG. 4. The difference between the closed orbit and the helical orbit is that on the closed orbit, the particle's energy is fixed and the initial and final points have the same energy, so the initial and final points can close together to form a closed orbit. In contrast, on the helical orbit, the energy of the particle at the final point is higher than that at the initial point, and the radius at the final point is larger than that at the initial point, so the helical orbit cannot be closed. The purpose of solving the radius of the closed orbit in this invention is because the energy of the particle on the closed orbit is fixed and easy to calculate. Although the particle's trajectory is a helical orbit, every point on the helical trajectory intersects with a corresponding closed orbit, so the energy change of the particle over one revolution can be indirectly calculated by considering multiple closed orbits passed through by the particle.

2. In equation (2), when i is 0 or 1, the corresponding magnetic field is the zero-order gradient and first-order gradient, which are equivalent to the dipole magnetic field and quadrupole magnetic field of a synchrotron, respectively. When i is 2 or 3, the corresponding magnetic field is the second-order gradient and third-order gradient, which are equivalent to the sextupole magnetic field and octupole magnetic field of a synchrotron, respectively. The dipole magnetic field and quadrupole magnetic field respectively provide the deflection and focusing, while the sextupole magnetic field and octupole magnetic field compensate for chromaticity and adjust the higher-order aberrations.

3. In this embodiment, the train of thought and method for adjusting the magnetic field based on the first-order gradient in formula (1) and realizing the quadrupole magnetic field equivalent were provided from formula (1) to formula (10.2). Referring to this train of thought and method, it is possible to adjust the magnetic field based on the second-order gradient, third-order gradient, and realize the sextupole magnetic field, octupole magnetic field equivalents.

However, the specific content still needs to be changed according to the individualized requirements for adjusting the magnetic field based on the second-order gradient, third-order gradient.

Furthermore, the present embodiment introduces a method for enhancing the focusing effect similar to the quadrupole lens by introducing the first-order gradient of the magnetic field in the large radial range of the main magnetic pole of the isochronous accelerator. The specific process is as follows:

1. Determine the radial oscillation frequency $v_x$ and axial oscillation frequency $v_z$ of the first-order gradient of the magnetic field.

2. Solve the magnetic field adjustment coefficients $a_i$ in formula (2) by solving the system of equations, where i is 0 and 1.

Furthermore, the specific method for determining the radial oscillation frequency $v_x$ and axial oscillation frequency $v_z$ in step 1 is as follows:

① According to the equation of motion of the particle, $$u'' + K(s)u = 0 \qquad (3)$$

Where u is the lateral displacement in the x or y direction; u" is the second derivative of the lateral displacement, x is the radial direction, and y is the axial direction;

② Obtaining the periodic function $K_x(s)$ of the focusing force;

$$K_x(s) = \frac{1}{B\rho}\frac{\partial B_y}{\partial x} + \frac{1}{\rho^2}, \quad K_y(s) = -\frac{1}{B\rho}\frac{\partial B_y}{\partial x} \qquad (4)$$

K(s) is a periodic function of the focusing force, $K_x(s)$ is a periodic function of the radial focusing force, and $K_y(s)$ is a periodic function of the axial focusing force, depending on the magnetic field generated by the magnet elements arranged around the circumference of the isochronous accelerator. In the formula, $\rho$ is the particle deflection radius, B is the magnetic induction intensity, and $B_y$ is the axial component of the magnetic induction intensity. Equation (3) is the Hill equation.

③ The transfer matrix within one magnetic field period is solved. One magnetic field period refers to a magnetic focusing unit and its corresponding drift space that is repeated periodically around the circumference. Choosing the energy corresponding to any loop as the starting point of the calculation, the closed orbit is obtained using the radial distribution of the magnetic field, and the transfer matrix M for the beam to propagate one magnetic field period along the equilibrium orbit is then obtained.

④ Based on the Hill equation, the relationship equation between the transfer matrix M and the beam optical parameters $\alpha$, $\beta$, and $\gamma$ is obtained. Therefore, $\alpha$, $\beta$, and $\gamma$ are solved.

⑤ Based on $\alpha$, $\beta$, and $\gamma$, the radial oscillation frequency $v_x$ and the axial oscillation frequency $v_z$ are solved.

The process of solving the transfer matrix within one magnetic field period (step 3) is as follows:

1) The variation of the particle phase space motion state in the FDF isochronous FFAG accelerator can be described as follows:

$$\begin{bmatrix} X \\ X' \end{bmatrix} = M_0 M_F M_0 M_D M_0 M_F \begin{bmatrix} X \\ X' \end{bmatrix} \qquad (5)$$

where x represents the transverse displacement, x' represents the particle scattering angle, $M_0$ is the transfer matrix in free space, $M_F$ and $M_D$ represent the transfer matrices for focusing field and defocusing field, respectively.

Supplementary Note 4:

Formula (5) is the matrix that describes the motion of a particle from position $x_0$ to x along the trajectory during one period of the magnetic field. It can be decomposed into three parts: the free space transport matrix $M_0$ for regions with no magnetic field, the focusing field transport matrix $M_F$ for regions with positive magnetic poles, and the defocusing field transport matrix $M_D$ for regions with negative magnetic poles. The focusing field can be further divided into the radial focusing field, which is described by the transport matrices $M_{F_x}$ and $M_{D_x}$, and the axial focusing field, which is described by the transport matrices $M_{F_z}$ and $M_{D_z}$.

$$M_0 = \begin{bmatrix} 1 & s \\ 0 & 1 \end{bmatrix} \qquad (6.1)$$

$$M_{F_x, D_x} = \begin{bmatrix} \cos\frac{\sqrt{1-n}}{\rho}s & \frac{\rho}{\sqrt{1-n}}\sin\frac{\sqrt{1-n}}{\rho}s \\ -\frac{\sqrt{1-n}}{\rho}\sin\frac{\sqrt{1-n}}{\rho}s & \cos\frac{\sqrt{1-n}}{\rho}s \end{bmatrix} \qquad (6.2)$$

$$M_{F_z, D_z} = \begin{bmatrix} \cos\frac{\sqrt{n}}{\rho}s & \frac{\rho}{\sqrt{n}}\sin\frac{\sqrt{n}}{\rho}s \\ -\frac{\sqrt{n}}{\rho}\sin\frac{\sqrt{n}}{\rho}s & \cos\frac{\sqrt{n}}{\rho}s \end{bmatrix} \qquad (6.3)$$

The transfer matrix $M_{F_x, D_x}$ in equation (6.2) represents the radial focusing and defocusing fields, where the transfer matrices for the focusing field $M_{F_x}$ and the defocusing field $M_{D_x}$ are expressed in the same way. The transfer matrix $M_{F_z, D_z}$ in equation (6.3) represents the axial focusing and defocusing fields, where the transfer matrices for the focusing field $M_{F_z}$ and the defocusing field $M_{D_z}$ are expressed in the same way.

$\rho$ is the bending radius, n is the magnetic field index, and s is the distance traveled by the particle.

$$n = -(r/B)\cdot(\partial B/\partial r) = \frac{a_1 r}{a_0 + a_1 r},$$

where r is the particle's orbit radius, B is the magnetic induction intensity, n can be expressed using the coefficients in formula (2), ($\partial B/\partial r$) is the magnetic field gradient adjustment coefficient a_i in formula (2), r is the radius of the closed orbit in formula (2), and B is the average magnetic field in formula (2). In the matrix, $M_{11}$ represents the magnification factor, and $M_{21}$ represents the focusing-defocusing factor.

2) The relationship between the transfer matrix in one magnetic field period and the magnetic field configuration $M_0$, $M_F$, $M_D$ is given by:

$$M = M_0 M_F M_0 M_D M_0 M_F \qquad (7)$$

Here, $M_F$ represents the transfer matrix in the two directions of the focusing field, $M_{F_x}$ and $M_{F_z}$, while $M_D$ represents the transfer matrix in the two directions of the defocusing field, $M_{D_x}$ and $M_{D_z}$.

3) Writing the matrix element $m_{ij}$ of formulas (6.2) and (6.3) for the i-th row and j-th column as $m_{ij}=f(a_0, a_1, s)$, where $a_0$ and $a_1$ correspond to the magnetic field adjustment coefficients $a_r$ in formula (2) when i is 0 or 1, and s is the distance traveled by the particle on the motion trajectory.

Obtaining the equation relating the transfer matrix M and the beam optical parameters $\alpha$, $\beta$, $\gamma$ based on the Hill equation, the process ④. Then $\alpha$, $\beta$, $\gamma$ are solved and the specific process is as follows:

a. According to the Hill equation, the solution of the Hill equation can be expressed using the transfer matrix M:

$$M = I\cos\mu + J\sin\mu, \; J = \begin{bmatrix} \alpha & \beta \\ -\gamma & -\alpha \end{bmatrix} \quad (8)$$

In formula (8), I is the unit matrix, $\alpha$, $\beta$, $\gamma$ are the Twiss parameters, and $\mu$ is the horizontal oscillation phase shift.

b. Based on formulas (6.1), (6.2), (7), and (8), the relationship between $\cos\mu$, $\beta$, $\alpha$, $\gamma$, and the matrix elements can be obtained to solve for $\alpha$, $\beta$, and $\gamma$.

$$\cos\mu = \frac{M_{11} + M_{22}}{2} \quad (9.1)$$

$$\beta = \frac{M_{12}}{\sin\mu} \quad (9.2)$$

$$\alpha = \frac{M_{11} - \cos\mu}{\sin\mu} \quad (9.3)$$

$$\gamma = -\frac{M_{21}}{\sin\mu} \quad (9.4)$$

The process ⑤ is to solve the radial oscillation frequencies $v_x$ and $v_z$ based on the $\alpha$, $\beta$, and $\gamma$ values. The specific process is as follows:

i. Establishing an integral equation for calculating the radial oscillation frequency.

$$v_x = \frac{N}{2\pi}\int_{s_o}^{s_o+L} \frac{1}{\beta(s)} ds \quad (10.1)$$

ii. Substituting formula (9.2) into formula (10.1), and solve the radial oscillation frequency $v_x$ using the function $\beta(s)$. N is the number of magnetic field periods in 360° in the azimuthal direction, and $s_0$ and $S_{0+L}$ are the starting and ending points of the magnetic field period, respectively.

Furthermore, the process (2): Solve the magnetic field adjustment coefficients $a_r$, i=0,1 of formula (2) by solving the system of equations, as follows:

I. Substituting the expression for $$\beta = \frac{M_{12}}{\sin\mu}$$

from equation (9.2) into equation (10.1).

II. Obtaining the integral equation (10.2) containing unknowns $a_0$ and $a_1$:

$$\frac{N}{2\pi}\int_{s_o}^{s_o+L} \frac{\sin\mu}{M_{12}(a_0, a_1, s)} ds \quad (10.2)$$

where $M_{12}$ ($a_0$, $a_1$, s) expressed in terms of matrix elements, with i=1 and j=2, and N is the number of magnetic periods in 360° around the circumference, $s_0$ is the starting point of a magnetic period and $S_{0+L}$ is the ending point.

Supplementary Explanation 5:

The use of i=1 and j=2 in $m_{ij}$ is to correspond to formula (9.2) where $$\beta = \frac{M_{12}}{\sin\mu}.$$

Formula (10.2) is substituted with formula (9.2).

III. Recalculating formula (9.1), (9.2), (9.3), and (9.4) using formula (6.1), formula (6.3), formula (7), and formula (8), then substituting formula (9.2) into formula (10.1). The function $\beta(s)$ is used to solve for the axial oscillation frequency $v_z$ in formula (10.1).

IV. Using the solved values of $v_x$ and $v_z$ to solve for $a_0$ and $a_1$ in formula (10.2) by simultaneous equations.

Furthermore, by introducing the first-order magnetic field gradient within the maximum radial range of the main magnet of the isochronous accelerator, a similar treatment of resonance as a quadrupole lens is achieved, which specifically includes:

1) Setting $v_x$ and $v_z$ as the radial and axial oscillation frequencies at the energy point where dangerous resonance occurs.

2) Substituting $v_x$ and $v_z$ into formula (10.2) to obtain formula (2) for $a_0$ and $a_1$. $a_0$ is used to adjust the deflection effect of the magnetic field, while $a_1$ is used to adjust the focusing effect of the magnetic field.

3) Adjusting the coefficients $a_0$ and $a_i$ to make the $v_x$ and $v_z$ near the resonance region reach the set values, thereby obtaining local oscillation frequency adjustment.

Figure 3:
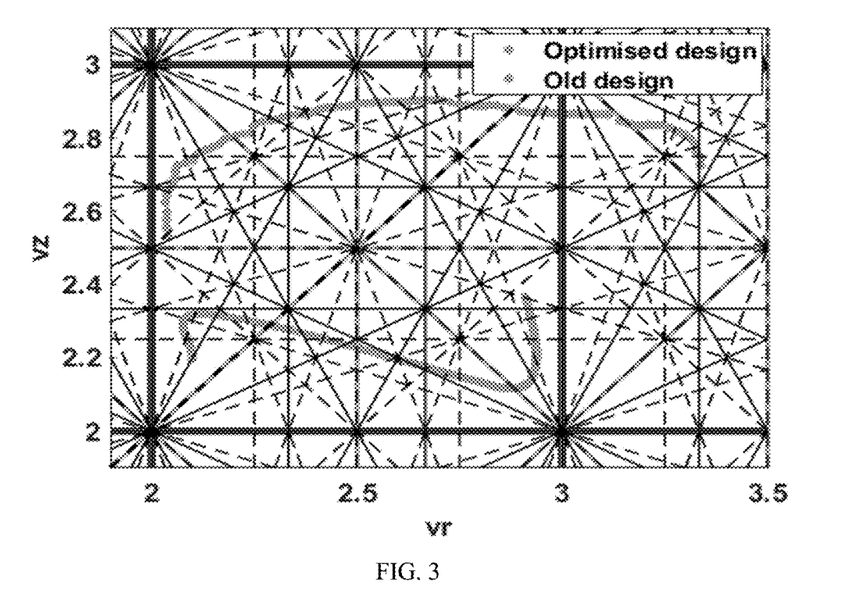
FIG. 3 shows a resonance handling path at the working point according to the present application.

Supplementary Explanation 6:

As shown in FIG. 3, $v_r$=3 is the resonance line. There are two lines in the figure, the upper one is designed according to the requirement of passing through the resonance, and the lower one is designed for the requirement of not passing through the resonance. The present application is designed for the requirement of not passing through the resonance on the lower line: when approaching the resonance line, the value of the working point $v_r$ is reduced while the value of $v_z$ is increased. By pulling the value of $v_r$ in the opposite direction of the coordinate axis, the resonance crossing is avoided.

Example 1

As an example, a 10 MeV high-current cyclotron central region test device is designed for an experimental verification work. The main magnet of the device is a 4-pole magnet with a pole radius of 45 cm, a total weight of 13 tons, and a machining accuracy better than 0.1 mm. The first-order gradient of the magnetic field was adjusted from a radius of 22 cm to a radius of 44.5 cm. Magnetic field measurements showed that the expected strong focusing force was obtained, with $v_z$ close to 0.6. The highest target beam intensity in the accelerator reached 432.6µ A. Due to the limitation of high-frequency machine power, the extracted external target beam current was 230.85µ A. The 10 MeV high-current cyclotron central region test device demonstrated that even small and compact isochronous cyclotrons can achieve stronger axial focusing by adjusting the magnetic field gradient over a large radial range. The device achieved a proton beam current of over 400μ A, demonstrating the technical capability of obtaining mA-level current from an accelerator physics perspective. The test device is also the first prototype of a PET small cyclotron accelerator developed independently in China, verifying the overall technical capability of domestically developed PET cyclotron accelerators. Subsequently, based on the experimental setup, optimization design was carried out. Taking into account the target of optimizing PET isotope production yield and the overall consideration of technical performance optimization, the magnetic pole radius was increased to 50 cm, and the extracted proton beam energy was increased to 14 MeV, with a total weight of nearly 15 tons. The magnetic field first-order gradient was adjusted from a radius of 22 cm to 49 cm, and $v_z$ was maintained at a level of 0.6.

The large range variation of the first-order magnetic field gradient can improve the beam intensity of the 10 MeV~20 MeV compact cyclotron, the second-order magnetic field gradient can break through the energy limit of the compact cyclotron and successfully develop a 100 MeV high-current cyclotron, and the third-order magnetic field gradient can be used to innovate and design a 2 GeV high-energy high-current isochronous FFAG accelerator.

It should be emphasized that the specific examples mentioned above are merely explanatory of the present application and are not intended to limit the scope of the invention. Those skilled in the art, after reading this specification, can make modifications to the above examples without creative contribution, but all modifications within the scope of the claims of the present application are protected by patent law.

What is claimed is:

1. A method for obtaining strong focusing of an isochronous accelerator by varying a magnetic field gradient in a large radial range, wherein a main magnet of the isochronous accelerator provides a bending effect and a focusing effect, which is equivalent to effects of using of quadrupole, sextupole, and octupole magnets in a synchrotron accelerator; the method comprises: introducing a first-order, a second-order, and a third-order magnetic field gradients in the large radial range of the main magnet of the isochronous accelerator to achieve an enhanced focusing, compensation of chromaticity, handling of resonances similar to that provided by a quadrupole, a sextupole, and octupole lenses, and obtain a transverse focusing force required for an isochronous continuous wave acceleration from 1 GeV to 2 GeV;

wherein providing, by the main magnet of isochronous accelerators, the bending effect and the focusing effect comprises:
1) Using a magnetic field with an angularly varying gradient as a main source of an axial focusing force, wherein, a magnetic field distribution is given by a formula of:

$$B(r,\theta)=B_0\gamma(r)[1+f\cos N\theta], N\geq 3 \quad (1)$$

wherein $B_0$ is a central magnetic field, $\gamma$ is a relativistic factor, N is a number of sectors, f is a flutter of a magnetic field and $\theta$ is an angular position; and
2) varying the magnetic field gradient radially to simultaneously vary a peak region magnetic field B(r) in a radial direction to satisfy a polynomial form:

$$B(r) = \sum_{i=0}^{n} a_i r^i \quad (2)$$

wherein $a_i$ is a magnetic field gradient adjustment coefficient, r is a closed orbit radius, i is an order of the magnetic field gradient ranging from 0 to n, wherein, the focusing effect refers to a change in an orbit radius of a particle when the particle passes through a magnetic peak region during a cyclotron motion, in addition to a deflection effect caused by the varying magnetic field gradient in different regions wherein introducing the first-order magnetic field gradient in the large radial range of the main magnet of the isochronous accelerator to achieve the enhanced focusing similar to that provided by the quadrupole lens comprises:
(1) solving for a radial oscillation frequency $v_x$ and an axial oscillation frequency $v_z$ of the first-order magnetic field gradient; and
(2) solving for the magnetic field gradient adjustment coefficient $a_i$ in the formula (2) by solving a system of equations, where i ranges from 0 to 1.

2. The method for obtaining strong focusing of an isochronous accelerator by varying a magnetic field gradient in a large radial range according to claim 1, wherein,
solving for the radial oscillation frequency $v_x$ and the axial oscillation frequency $v_z$ of the first-order magnetic field gradient in the process (1) comprises:
① Solving for a motion equation of a particle:

$$u''+K(s)u=0 \quad (3)$$

wherein u is a lateral displacement in an x or y direction; u" is a second derivative of the lateral displacement, x is the radial direction, and y is an axial direction;
② obtaining a periodic function $K_x(s)$ of a focusing force:

$$K_x(s) = \frac{1}{B\rho}\frac{\partial B_y}{\partial x} + \frac{1}{\rho^2}, K_y(s) = -\frac{1}{B\rho}\frac{\partial B_y}{\partial x} \quad (4)$$

wherein K(s) is a periodic function of the focusing force, $K_x(s)$ is a periodic function of a radial focusing force, and $K_y(s)$ is a periodic function of the axial focusing force that depends on a magnetic field generated by magnet elements arranged around circumference of the isochronous accelerator; $\rho$ is a particle deflection radius, B is a magnetic induction intensity, and $B_y$ is an axial component of the magnetic induction intensity, and the equation (3) is a Hill equation;
③ solving for a transfer matrix within one magnetic field period; wherein the one magnetic field period refers to a magnetic focusing unit and a drift space corresponding to the magnetic focusing unit that is repeated periodically around the circumference; an energy corresponding to any loop is selected as a starting point for calculation, a closed orbit is obtained using a radial distribution of the magnetic field, and the transfer matrix M for a beam to propagate the one magnetic field period along the equilibrium orbit is obtained;
④ based on the Hill equation, obtaining a relationship equation between the transfer matrix M and beam optical parameters α, β, and γ to solve for the α, β, and γ; and
⑤ based on the α, β, and γ, solving for the radial oscillation frequency $v_x$ and the axial oscillation frequency $v_z$.

3. The method for obtaining strong focusing of an isochronous accelerator by varying a magnetic field gradient in a large radial range according to claim 2, wherein,
solving for the transfer matrix within the one magnetic field period comprises:
1) Varying a particle phase space motion state in a Focusing-Defocusing-Focusing (FDF) isochronous Fixed-Field Alternating Gradient (FFAG) accelerator as:

$$\begin{bmatrix} x \\ x' \end{bmatrix} = M_0 M_F M_0 M_D M_0 M_F \begin{bmatrix} x \\ x' \end{bmatrix} \quad (5)$$

wherein x represents a transverse displacement, x' represents a particle scattering angle, $M_0$ is a transfer matrix in a free space, $M_F$ and $M_D$ represent transfer matrices for focusing field and defocusing field, respectively as:

$$M_0 = \begin{bmatrix} 1 & s \\ 0 & 1 \end{bmatrix} \quad (6.1)$$

$$M_{F_x,D_x} = \begin{bmatrix} \cos\frac{\sqrt{1-n}}{\rho}s & \frac{\rho}{\sqrt{1-n}}\sin\frac{\sqrt{1-n}}{\rho}s \\ -\frac{\sqrt{1-n}}{\rho}\sin\frac{\sqrt{1-n}}{\rho}s & \cos\frac{\sqrt{1-n}}{\rho}s \end{bmatrix} \quad (6.2)$$

$$M_{F_z D_z} = \begin{bmatrix} \cos\frac{\sqrt{n}}{\rho}s & \frac{\rho}{\sqrt{n}}\sin\frac{\sqrt{n}}{\rho}s \\ -\frac{\sqrt{n}}{\rho}\sin\frac{\sqrt{n}}{\rho}s & \cos\frac{\sqrt{n}}{\rho}s \end{bmatrix} \quad (6.3)$$

a transfer matrix $M_{F_x,D_x}$ in the formula (6.2) represents a radial focusing and defocusing fields, the transfer matrices for the focusing field $M_{F_x}$ and the defocusing field $M_{D_x}$ are expressed in a same way; the transfer matrix $M_{F_z,D_z}$ in equation the formula (6.3) represents an axial focusing and defocusing fields, the transfer matrices for the focusing field $M_{F_z}$ and the defocusing field $M_{D_z}$ are expressed in a same way;
$\rho$ is a bending radius, n is a magnetic field index, and s is a distance traveled by the particle; n is given by n=−(r/B)·(∂B/∂r), wherein r is a motion radius of the particle, B is a magnetic induction, and n is expressed by using coefficients in the formula (2); (∂B/∂r) is a magnetic field gradient adjustment coefficient $a_i$ in the formula (2), r is the closed orbit radius in the formula (2), and B is an average of the magnetic field in the formula (2); $M_{11}$ represents a magnification factor and $M_{21}$ represents a focusing-defocusing factor;
2) obtaining a relationship between the transfer matrix in the one magnetic field period and the magnetic field configuration $M_0$, $M_F$, $M_D$ by:

$$M = M_0 M_F M_0 M_D M_0 M_F \quad (7)$$

$M_F$ represents a transfer matrix in two directions of the focusing field $M_{F_x}$ and $M_{F_z}$, $M_D$ represents the transfer matrix in two directions of the defocusing field $M_{D_x}$ and $M_{D_z}$; and
3) writing a matrix element $m_{ij}$ of formulas (6.2) and (6.3) for an i-th row and a j-th column as $m_{ij}$=f($a_0$, $a_1$, s), wherein $a_0$ and $a_1$ correspond to the magnetic field gradient adjustment coefficient $a_i$ in the formula (2) when i is 0 or 1, and s is the distance traveled by the particle on the motion trajectory.

4. The method for obtaining strong focusing of an isochronous accelerator by varying a magnetic field gradient in a large radial range according to claim 3, wherein,
obtaining, based on the Hill equation, the relationship equation between the transfer matrix M and the beam optical parameters α, β, and γ to solve for the α, β, and γ comprises:
a. according to the Hill equation, obtaining a solution of the Hill equation by using a transfer matrix M as:

$$M = I\cos\mu + J\sin\mu, \quad J = \begin{bmatrix} \alpha & \beta \\ -\gamma & -\alpha \end{bmatrix} \quad (8)$$

wherein, I is a unit matrix, α, β, γ are Twiss parameters, and μ is a horizontal oscillation phase shift;
b. based on the formulas (6.1), (6.2), (7), and (8), obtaining a relationship between cos μ, β, α, γ, and matrix elements to solve for the α, β, and γ:

$$\cos\mu = \frac{M_{11} + M_{22}}{2} \quad (9.1)$$

$$\beta = \frac{M_{12}}{\sin\mu} \quad (9.2)$$

$$\alpha = \frac{M_{11} - \cos\mu}{\sin\mu} \quad (9.3)$$

$$\gamma = -\frac{M_{21}}{\sin\mu}. \quad (9.4)$$

5. The method for obtaining strong focusing of an isochronous accelerator by varying a magnetic field gradient in a large radial range according to claim 4, wherein,
solving, based on the α, β, and γ, for the radial oscillation frequency $v_x$ and the axial oscillation frequency $v_z$ comprises:
i. establishing an integral equation for calculating the radial oscillation frequency:

$$v_x = \frac{N}{2\pi}\int_{s_o}^{s_o+L}\frac{1}{\beta(s)}ds \quad (10.1)$$

ii. substituting formula (9.2) into formula (10.1), and solving for the radial oscillation frequency $v_x$ in formula (10.2) by using a function β(s); N is number of magnetic field periods in 360° in an azimuthal direction, and $s_0$ and $s_{0+L}$ are a starting point and an ending point of the magnetic field periods, respectively.

6. The method for obtaining strong focusing of an isochronous accelerator by varying a magnetic field gradient in a large radial range according to claim 5, wherein,
solving for the magnetic field gradient adjustment coefficient $a_i$ in the formula (2) by solving the system of equations, where i ranges from 0 to 1, comprises:
I. substituting an expression for $$\beta = \frac{M_{12}}{\sin\mu}$$

from the formula (9.2) into the formula (10.1);
II. obtaining a formula (10.2) as an integral equation (10.2) containing unknowns of $a_0$ and $a_1$:

$$\frac{N}{2\pi} \int_{s_o}^{s_o+L} \frac{\sin\mu}{M_{12}(a_0, a_1, s)} ds \tag{10.2}$$

wherein $M_{12}(a_0, a_1, s)$ is expressed in terms of matrix elements, with i=1 and j=2, and N is number of magnetic periods in 360° around the circumference, $s_0$ is a starting point of a magnetic period and $s_{0+L}$ is an ending point;

III. recalculating the formulas (9.1), (9.2), (9.3), and (9.4) by using the formulas (6.1), (6.3), (7), and (8), and substituting the formula (9.2) into the formula (10.1) to obtain the axial oscillation frequency $v_x$ in the formula (10.1) by using the function $\beta(s)$; and IV. using the solved values of $v_x$ and $v_z$ to solve for $a_0$ and $a_1$ in the formula (10.2).

7. The method for obtaining strong focusing of an isochronous accelerator by varying a magnetic field gradient in a large radial range according to claim 6, wherein,
introducing the first-order magnetic field gradient in the large radial range of the main magnet of the isochronous accelerator to achieve the handling of resonances similar to that provided by the quadrupole lens comprises:
1) Setting $v_x$ and $v_z$ as a radial and axial oscillation frequencies at an energy point before dangerous resonance occurs;
2) substituting $v_x$ and $v_z$ into the formula (10.2) to obtain $a_0$ and $a_1$ in the formula (2); wherein $a_0$ is used to adjust a deflection effect of the magnetic field, and $a_1$ is used to adjust the focusing effect of the magnetic field; and
3) adjusting the coefficients $a_0$ and $a_1$ to make values of $v_x$ and $v_z$ near a resonance region reach preset values, for obtaining a local oscillation frequency adjustment.

\* \* \* \* \*